United States Patent [19]
Nicholson et al.

[11] 3,866,870
[45] Feb. 18, 1975

[54] CORD ANCHORAGE SECURING DEVICE AND SECURE CORD ANCHORAGE

[75] Inventors: John H. Nicholson, Perndowne, England; William Jemison, Summit, N.J.

[73] Assignee: Heyman Manufacturing Company, Kenilworth, N.J.

[22] Filed: Aug. 13, 1973

[21] Appl. No.: 387,677

Related U.S. Application Data

[62] Division of Ser. No. 223,203, Feb. 3, 1972, Pat. No. 3,779,494.

[52] U.S. Cl............ 248/56, 174/153 G, 339/103 B
[51] Int. Cl............................................... F16l 5/00
[58] Field of Search....... 248/56; 24/265 R, 265 SH, 24/265 SC, 265 AL, 16 PB, 72.7, 73 A, 30.5 S, 30.5 P, 129 D, 201 A; 16/2; 285/117; 339/103 B; 174/65 G, 153 G; 222/79; 220/38.5

[56] References Cited
UNITED STATES PATENTS

| | | | |
|---|---|---|---|
| 3,091,370 | 5/1963 | Weiner | 222/79 |
| 3,572,465 | 3/1971 | Olson | 220/38.5 X |
| 3,737,066 | 6/1973 | Ames | 220/38.5 X |

FOREIGN PATENTS OR APPLICATIONS

| | | | |
|---|---|---|---|
| 1,253,986 | 11/1971 | Great Britain | |
| 1,253,868 | 1/1961 | France | 220/38.5 |

Primary Examiner—Roy D. Frazier
Assistant Examiner—Rodney H. Bonck
Attorney, Agent, or Firm—Auslander & Thomas

[57] ABSTRACT

A cord anchorage device is provided with an attachable or integral device to secure the cord anchorage device to an appliance or aperture wall so that the anchorage components may not be readily lost when securing a cord.

2 Claims, 21 Drawing Figures

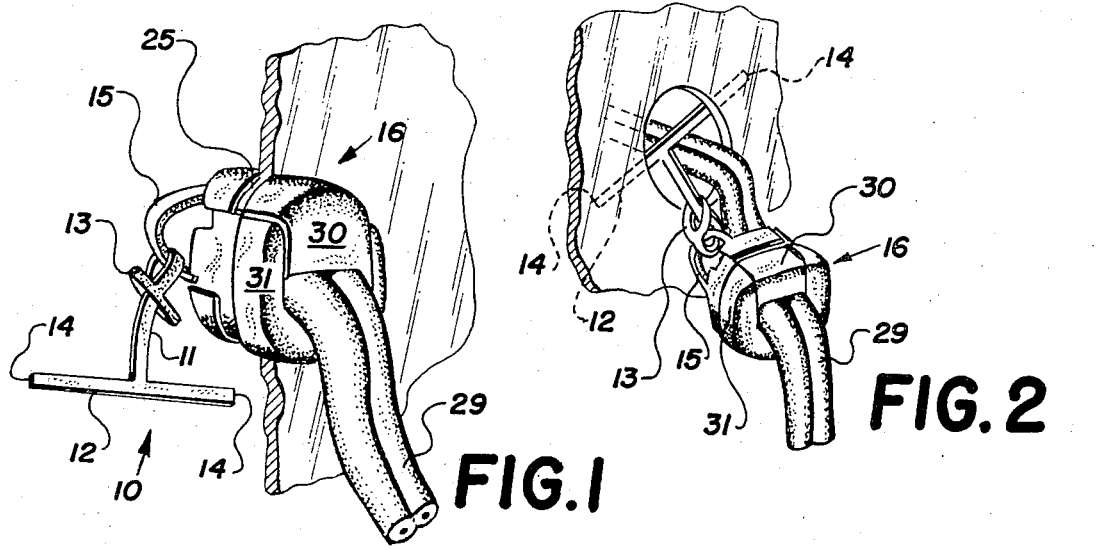
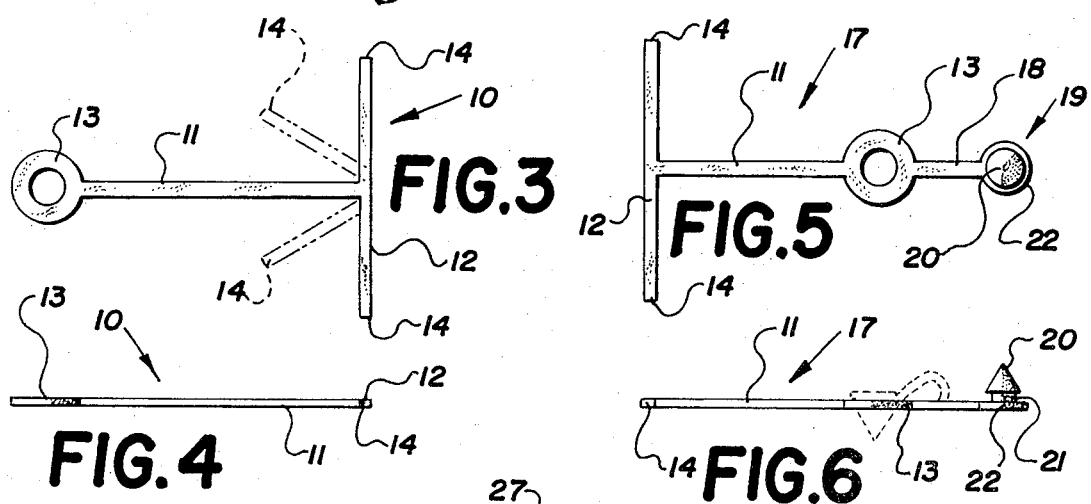
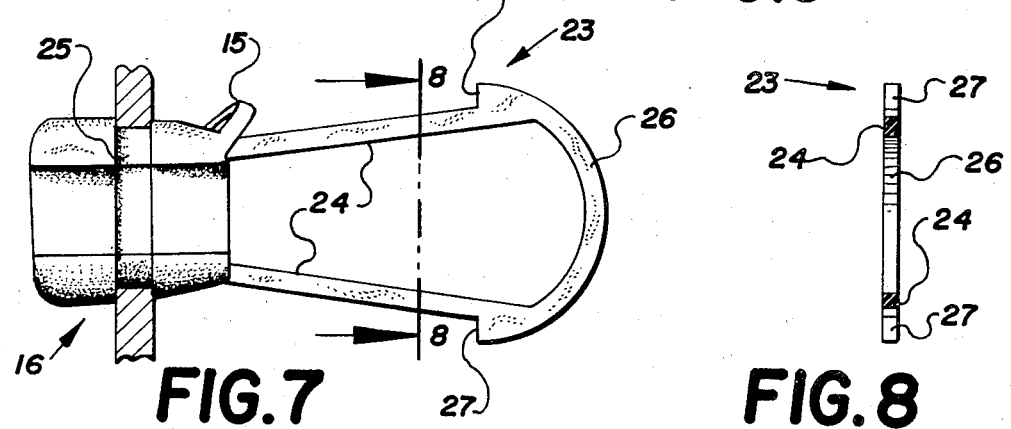

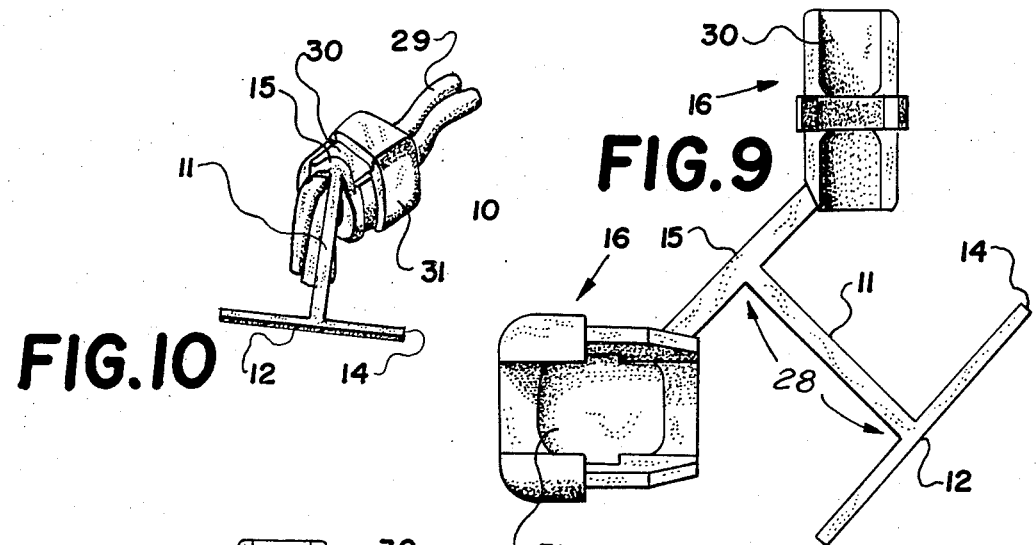
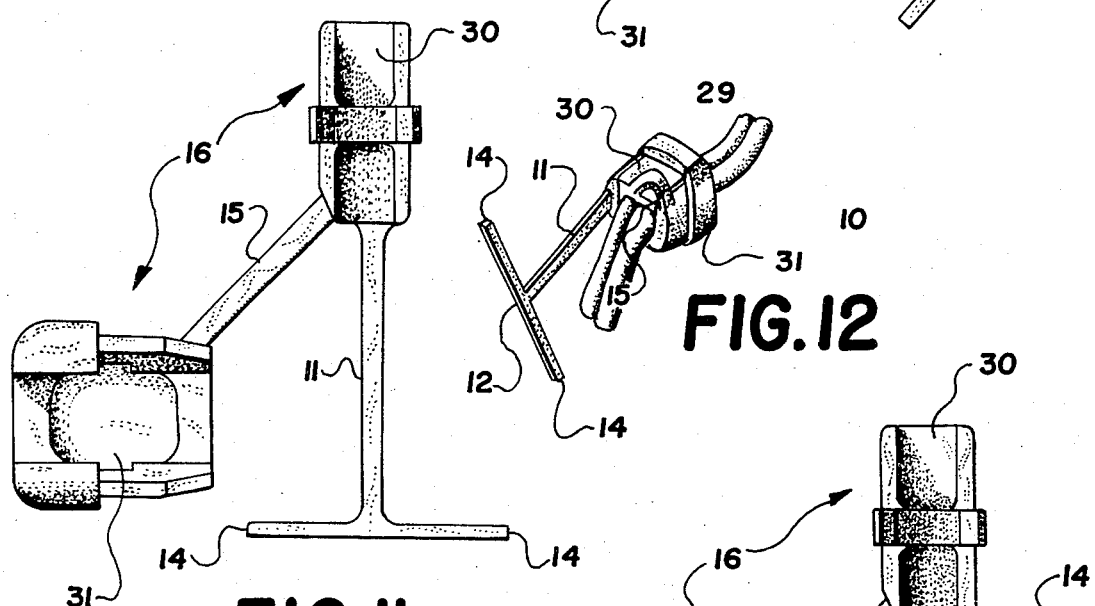
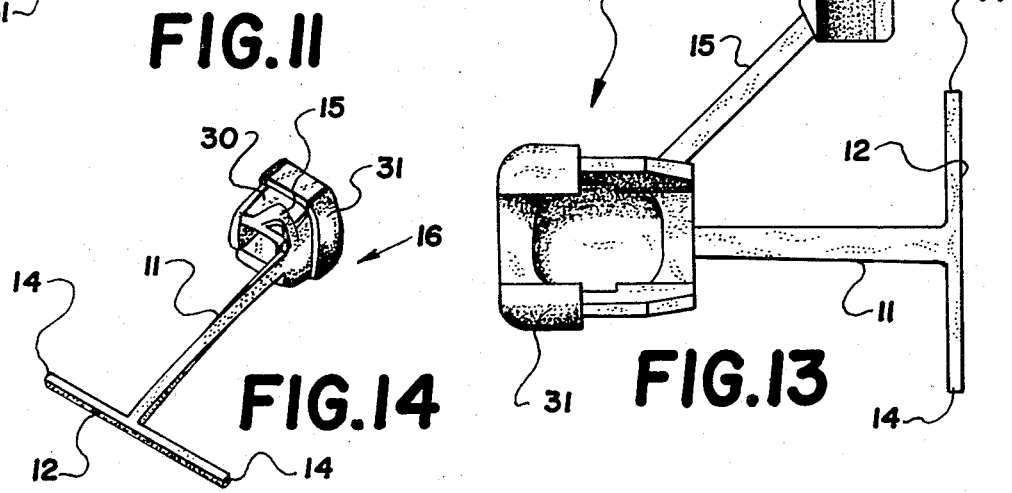

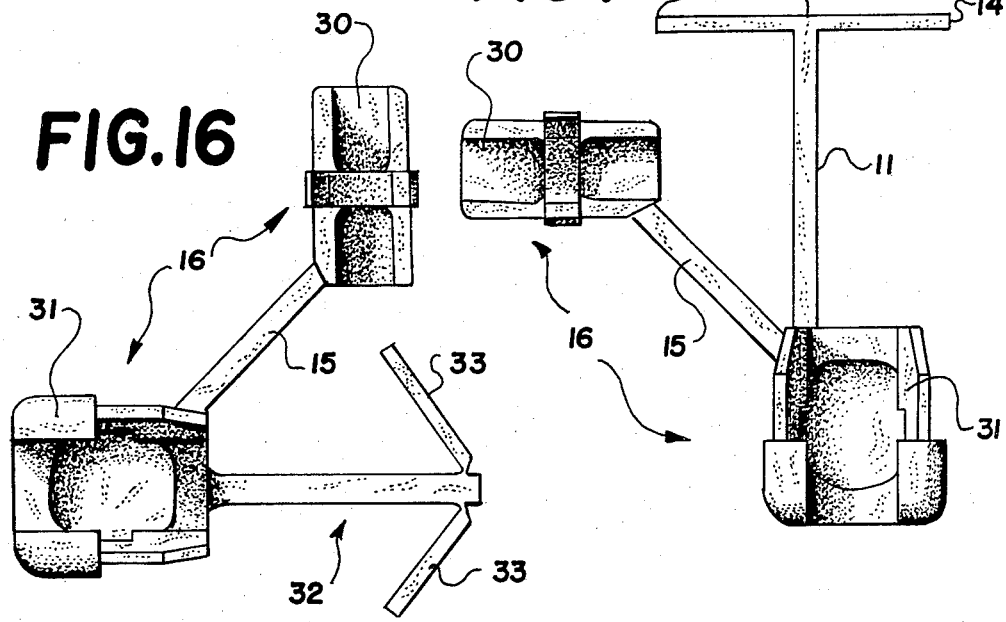
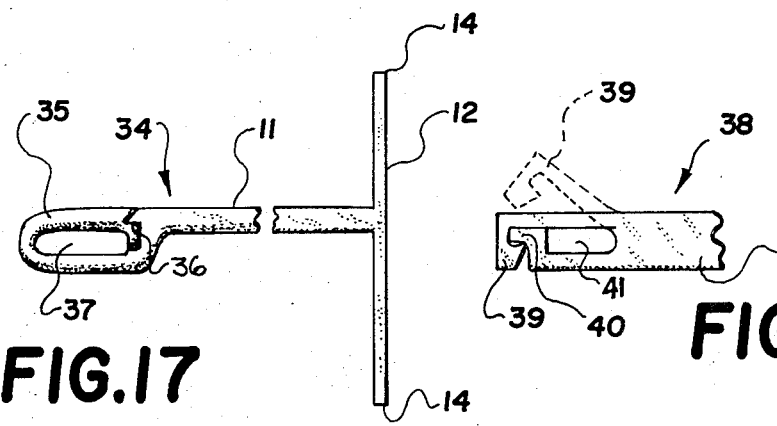
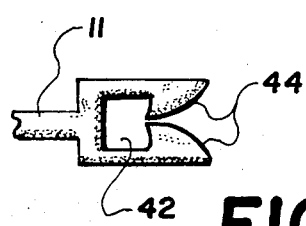
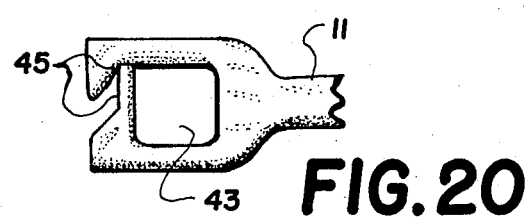

3,866,870

1

CORD ANCHORAGE SECURING DEVICE AND SECURE CORD ANCHORAGE

This is a division, of application Ser. No. 223,203 filed Feb. 3, 1972 and now U.S. Pat. No. 3,779,494.

The present invention relates to a strain relief or cord anchorage securing device and a secure strain relief or cord anchorage device.

In the past numerous devices have been used to hold electric cords or cables anchored in apertures in appliances or chassis. Such devices usually provided relief against strain on the cord being transmitted to the point of connection of the cord.

In the most usual form, the devices were bushings which engaged themselves to the aperture in appliance or chassis, while holding the cord by means included in the bushing construction.

Such devices of the past seldom took into consideration the need for securing the anchor or bushing to the appliance by means other than those used for holding the device in the aperture.

Many cord anchorage devices are in use today without any provision for secondary security, securing them to the appliances in which they are employed.

According to the present invention, a cord anchorage or strain relief securing device is provided, useable with existing cord anchorage devices or strain relief devices which can secure the strain relief or cord anchorage device to the appliance or chassis in which it is used. An integral device may be provided integral to cord anchorage devices or strain reliefs.

Although such novel feature or features believed to be characteristic of the invention are pointed out in the claims, the invention and the manner in which it may be carried out may be further understood by reference to the description following and the accompanying drawings.

FIG. 1 is a broken away isometric elevation of a strain relief and cord including an appliance securing device of the present invention.

FIG. 2 is a view of FIG. 1 showing the strain relief out of the aperture securely fixed to the appliance by the appliance securing device of the present invention.

FIG. 3 is a plan view of an appliance securing device of FIGS. 1 and 2.

FIG. 4 is a side elevation of FIG. 3.

FIG. 5 is a plan view of another embodiment of the appliance securing device of the present invention.

FIG. 6 is a side elevation of FIG. 5 including closure of the end loop.

FIG. 7 is another embodiment of the appliance securing device of the present invention.

FIG. 8 is a view of FIG. 7 at lines 8—8.

FIG. 9 is a plan view of a strain relief bushing including an integral appliance securing device on its strap.

FIG. 10 is the strain relief bushing of FIG. 9 closed on a cord showing the appliance securing device of the present invention.

FIG. 11 is a plan view of a strain relief bushing including an integral appliance securing device on its grip block.

FIG. 12 is the strain relief bushing of FIG. 11 closed on a cord showing the appliance securing device of the present invention.

FIG. 13 is a plan view of a strain relief bushing including an integral appliance securing on its shank.

2

FIG. 14 is the strain relief bushing of FIG. 13 closed on a cord showing the appliance securing device of the present invention.

FIG. 15 is a plan view of a strain relief bushing including an integral appliance securing device in an optional position on its shank.

FIG. 16 is a plan view of a strain relief bushing including a variant appliance securing device on its shank.

FIG. 17 is a broken away view of an appliance securing device with a variant end.

FIG. 18 is a side detail of another variant end.

FIG. 19 is a side detail of another variant end.

FIG. 20 is a detail of another variant end.

Figure 21:
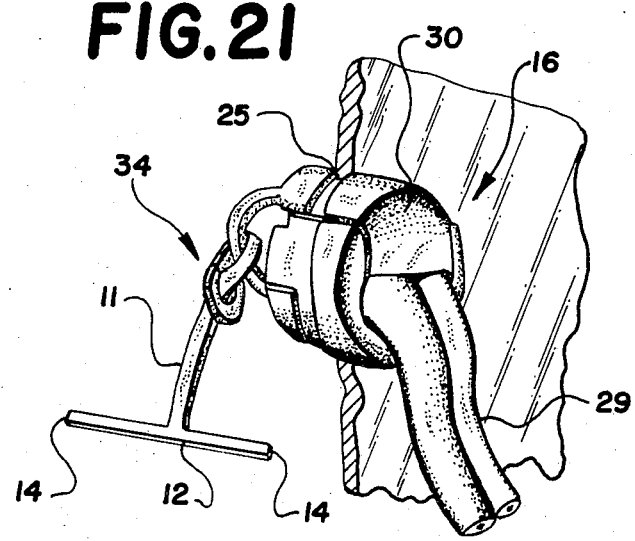

FIG. 21 is a view of FIG. 1 with an appliance securing device of FIG. 17 held in the strap by its end.

Figure 22:
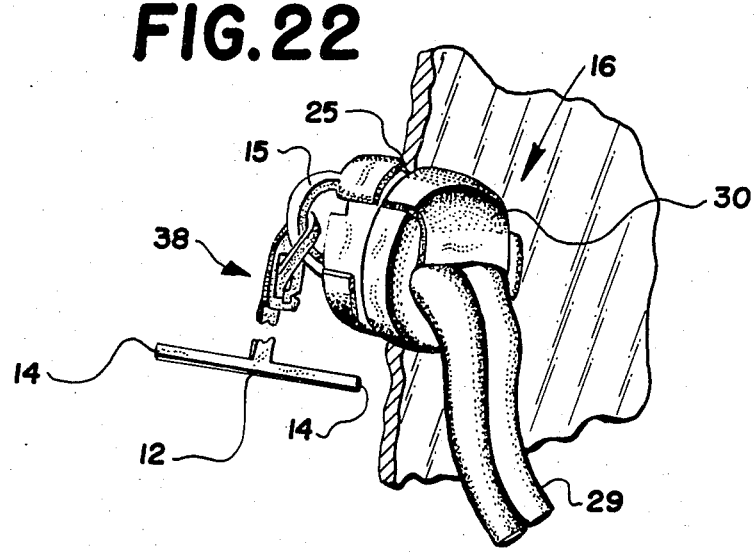

FIG. 22 is a view of FIG. 1 with an appliance securing device of FIG. 18 looped about the strap of the strain relief bushing and attached to itself.

Referring now to the figures in greater detail, where like reference numbers denote like parts in the various figures.

The appliance securing device 10, or chassis securing device, as shown in FIG. 3 includes a stem 11 with an integral T bar 12 at one end of the stem 11 and an integral eyelet 13 at the other end of the stem 11. The appliance securing device 10 is preferably made of a flexible dielectric plastic with a degree of natural stiffness, resilience and resistance. The arms 14 may flex as indicated in FIG. 3 in order to be looped to a strap 15 or webbing of a cord anchorage device 16, as shown in FIGS. 1 and 2. As can be seen in FIG. 4, the appliance securing device 10 does not have to be particularly thick in cross section.

The appliance securing device 17, as shown in FIGS. 5 and 6, has a stem 11, T bar 12, arms 14 and the eyelet 13, just as the appliance securing device 10 has. The appliance securing device 17, though, includes an additional stem 18 extending from the eyelet 13 and a snap fastener 19 as illustrated in this instance with a conical head 20, a recessed neck 21 and a base portion 22. Thus, the snap fastener 19 may be closed into the eyelet 13 as indicated in FIG. 6.

In FIGS. 7 and 8, a variant appliance securing device 23 is shown integral to a cord anchorage device 16. Two integral stems 24 extend rearward from the cord anchorage device 16 at an angle expanding the distance between the stems 24, preferably beyond the width or diameter of the aperture 25 for which the cord anchorage device 16 is extended. Integral to the stems 24 at their ends is a yoke 26, in this case curved, having edges 27 protruding wider than the stems 24 so that the walls about an aperture 25 would be grasped by the edges 27. In FIG. 8 it can be seen that not much thickness is required to effectuate the purpose of this appliance securing device 23.

In FIG. 9 a conventional cord anchorage device 16 for strain relief or cord anchorage is shown with an integral appliance securing device 28 having a stem 11 extending from the strap 15. The cord anchorage device 16 is shown in closed position over a cord 29 with its T bar 12 extending as it might if loose in the aperture 25, as shown in FIG. 2.

In FIGS. 11 through 16, variant appliance securing devices 10 are shown molded in different positions on cord anchorage devices 16, such as the appliance securing device 10 as shown in FIGS. 11 and 12 coming off the grip block 30 of the cord anchorage device 16.

In FIGS. 13 and 14, the appliance securing device 10 extends from the shank portion 31 of a cord anchorage device 16.

In FIG. 15, an appliance securing device 10 is shown in another optional position off the shank 30 of a cord anchorage device 16.

In FIG. 16 an appliance securing device 32 has a normal stem 11 and downsloping arms 33, which may easily be flexed to pass into an aperture 25, but hold the walls of the aperture 25 when the cord anchorage device 16 is loose as shown in FIG. 2.

In FIG. 17 an appliance securing device 34 is disclosed having a snap arm 35 which catches the latch 36. The closing of the snap arm 35 with the latch 36 forms an eyelet 37.

In FIG. 18 an appliance securing device 38 has an overriding arm 39 engageable with a latch arm 40 which latches to form an eyelet 41.

FIGS. 19 and 20 show eyelets 42, 43 with strap or stem engaging fingers 44, 45 as exemplary forms of eyelets of the present invention.

In use, an appliance securing device 10 has its arms 14 threaded through the eyelet 13 and looped around a strap 15, as shown in FIG. 1. In the event that the cord anchorage device 16 becomes disengaged from the aperture 25 or slips from grasp while being inserted in the aperture 25, the cord anchorage device 16 cannot readily be lost, since at least one part is securely fixed to the aperture wall by the appliance securing device 10 or the appliance securing device 10, with or without the cord 29, is held by the arms 14 as shown in FIG. 2.

The appliance securing device 17 may be snapped over a strap 15 or looped by closing the snap fastener 19, then threaded around a strap 15 as the appliance securing device 10 is.

The appliance securing device 23 requires no further action to use. The two stems 24 hold the yoke 26 which may be flexed to fit into the aperture 25 and serves to securely hold the component cord anchorage device 16 securely fixed to the wall about the aperture as do all the appliance securing devices of the present invention.

The appliance securing devices 10, 28, 32, 34, as shown in FIGS. 9 through 16 are all integral to the cord anchorage devices 16 and function in the same manner to securely hold the component cord anchorage device 16 securely fixed to the wall about the aperture.

The eyelet 37, as shown in FIG. 17 may be looped about the strap 15 to perform its funtion, as an appliance securing device 34, as shown in FIG. 21, or may be threaded through itself through the eyelet 37 and used as shown in FIGS. 1 and 2 with the stem 11 acting as a webbing.

The eyelet 41, as shown in FIG. 18, is closed to form a loop, then the arms 14 are threaded through the eyelet 41, as shown in FIG. 22 to hold the cord anchorage device 16.

The fingers 44, 45, as shown in FIGS. 19 and 20, may be used to make a loop in a stem 11 and then looped over a strap 15, or they may be looped onto the stem 11 over the strap 15 to hold the cord anchorage devices of the present invention.

The terms and expressions which are employed are used as terms of description; it is recognized, though, that various modifications are possible.

What is claimed is:

1. In combination an appliance securing device for securing an electric cord anchorage device to a body having an aperture adapted to receive said electric cord anchorage device, and an electric cord anchorage device, said electric cord anchorage device comprising at least a grip block and a shank, said appliance securing device having a resilient arm portion and at least two integral stem portions, said at least two stem portions extending from a point inward of the ends of said resilient arm portions spaced apart a distance greater than the width of said aperture, and said electric cord anchorage device being integral to said stem portions.

2. The invention of claim 1 wherein said arm portion is a yoke.

* * * * *